(12) United States Patent
Schmidt

(10) Patent No.: US 11,501,304 B2
(45) Date of Patent: Nov. 15, 2022

(54) SYSTEMS AND METHODS FOR CLASSIFYING IMBALANCED DATA

(71) Applicant: Synchrony Bank, Stamford, CT (US)

(72) Inventor: Arnold James Schmidt, Palo Alto, CA (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 17/197,324

(22) Filed: Mar. 10, 2021

(65) Prior Publication Data

US 2021/0287222 A1    Sep. 16, 2021

Related U.S. Application Data

(60) Provisional application No. 62/988,305, filed on Mar. 11, 2020.

(51) Int. Cl.
| | |
|---|---|
| G06Q 20/40 | (2012.01) |
| G06Q 20/20 | (2012.01) |
| G06Q 20/38 | (2012.01) |
| G06K 9/62 | (2022.01) |
| G06N 20/00 | (2019.01) |

(52) U.S. Cl.
CPC ......... *G06Q 20/4016* (2013.01); *G06K 9/627* (2013.01); *G06N 20/00* (2019.01); *G06Q 20/20* (2013.01); *G06Q 20/382* (2013.01)

(58) Field of Classification Search
CPC ..... G06Q 20/4016; G06K 9/627; G06N 20/00
USPC ................. 705/44; 713/182; 726/1
See application file for complete search history.

(56) References Cited

U.S. PATENT DOCUMENTS

| | | | |
|---|---|---|---|
| 2015/0262184 A1* | 9/2015 | Wang | G06Q 90/00 |
| | | | 705/44 |
| 2016/0005029 A1* | 1/2016 | Ivey | G06Q 20/409 |
| | | | 705/44 |
| 2019/0378050 A1* | 12/2019 | Edkin | G06Q 30/0185 |

OTHER PUBLICATIONS

Aub Chapman and Russell G. Smith, Controlling Financial Services Fraud. Australian Institute of Criminology. Feb. 2001. (Year: 2001).*
Balaji GN, Machine Learning Approaches for Credit Card Fraud Detection. International Journal of Engineering & Technology. 2018. (Year: 2018).*
Lakshmi P., Ganesh Menon. Forensic Accounting: A Checkmate for Corporate Fraud. Journal of Modern Accounting and Auditing, Sep. 2016, vol. 12, No. 9, 453-460 (Year: 2016).*

* cited by examiner

*Primary Examiner* — Bruce I Ebersman
*Assistant Examiner* — John O Preston
(74) *Attorney, Agent, or Firm* — Polsinelli PC

(57) ABSTRACT

A transaction classification system obtains a data set including first data associated with a first characteristic and second data associated with a second characteristic. In response to obtaining the data set, the system uses a classification model to generate a classification by classifying the first data into majority data and the second data into minority data. From the classification and using the classification model, the system determines a cost. The system modifies the classification model based on this cost to generate an updated classification model. The system uses the updated classification model to re-classify a subset of the first data into the minority data and a subset of the second data into the majority data.

30 Claims, 6 Drawing Sheets

SYSTEMS AND METHODS FOR CLASSIFYING IMBALANCED DATA

CROSS-REFERENCE TO RELATED APPLICATION

This application claims the benefit of U.S. Provisional Application No. 62/988,305, filed on Mar. 11, 2020, which is incorporated in its entirety herein by reference.

FIELD

The present disclosure relates generally to classifying data. In one example, the systems and methods described herein may be used to classify imbalanced data, such as majority data which shares a first characteristic and minority data which shares a second characteristic.

The present disclosure relates generally to classifying data. In one example, the systems and methods described herein may be used to classify imbalanced data, such as majority data which shares a first characteristic and minority data which shares a second characteristic.

SUMMARY

Disclosed embodiments may provide a system for generating a classification model that can classify imbalanced data. The system provides a loss function that is modified in order to penalize errors in one class (e.g., false positive misclassifications) over errors in another class (e.g., false negative misclassifications), resulting in classification models that are trained to mitigate classification bias and to minimize a quantifiable loss instead of empirical risk. Metrics may be applied that are more sensitive and effective as compared to traditional metrics used to quantify the quality of a model.

According to some embodiments, a computer-implemented method is provided. The computer-implemented method comprises obtaining a data set including first data associated with a first characteristic and second data associated with a second characteristic. The method further comprises using a classification model to generate a classification. The classification includes classifying the first data into majority data based on the first characteristic and the second data into minority data based on the second characteristic. The method further comprises determining a cost resulting from the classification, wherein the cost is determined using the classification model. The method further comprises modifying the classification model based on the cost, resulting in an updated classification model. The method further comprises re-classifying a subset of the first data into the minority data and a subset of the second data into the majority data. The re-classifying is performed using the updated classification model.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
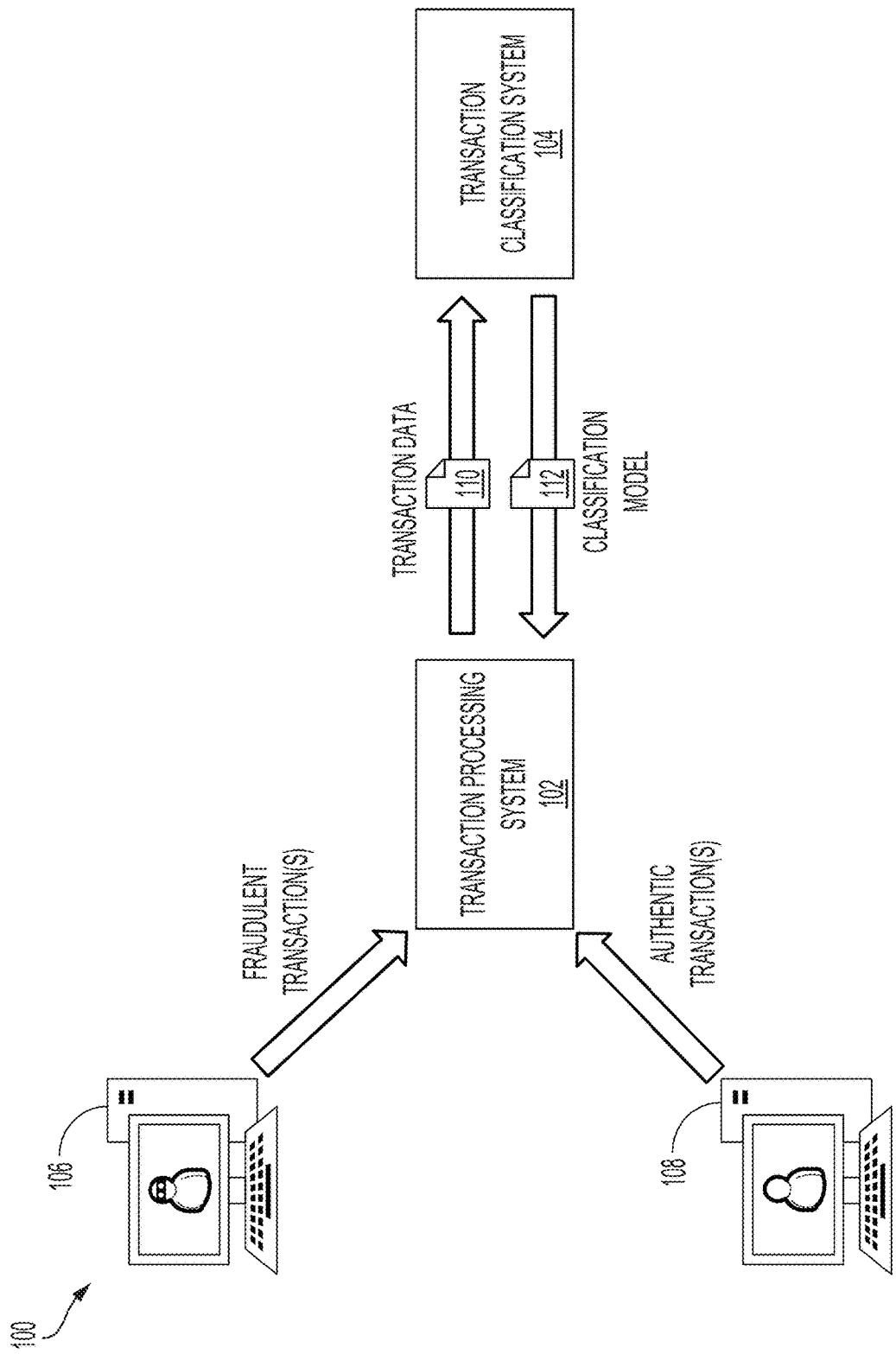
FIG. 1 shows an illustrative example of an environment in which a transaction classification system utilizes a transaction data set as input to derive a classification model that satisfies one or more criteria in accordance with various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments may provide a framework to generate and train classification models subject to a set of metrics for the classification of imbalanced data. For example, using a training data set that includes transaction data (e.g., data corresponding to authentic and fraudulent transactions), a transaction classification system can use the data set as input to a classification model to generate a set of classifications for the data set. The transaction classification system may evaluate this set of classifications using a modified loss function that differentiates and weighs classification errors resulting in false positives (e.g., an authentic transaction being classified as being fraudulent) and false negatives (e.g., fraudulent transactions being classified as being authentic). Additionally, the transaction classification system can generate a classification model based on quantifiable metrics that can be determined using the modified loss function such that the classification model can classify data sets subject to these quantifiable metrics.

Imbalanced data refers to a classification problem where the classes are not represented in an equal manner. Classification is a machine learning problem where an attempt is made to identify to which set of categories a new observation belongs. When a classification model attempts to classify highly imbalanced data into either majority data or minority data, the classification model tends to classify data into the majority class. Even if a high level of accuracy is obtained, the classification model may not be effective since the minority class may not be efficiently identified. This is because the classification model may be provided with a comparatively lesser number of minority class samples for it to learn and identify the nuances surrounding it. Many real-world classification problems like fraud detection, loss forecasting, anomaly detection, and customer promotion suffer from this issue.

FIG. 1 shows an illustrative example of an environment 100 in which a transaction classification system 104 utilizes a transaction data set 110 as input to derive a classification model 112 that satisfies one or more criteria in accordance with various embodiments. In the environment 100, a transaction processing system 102 transmits a request to a transaction classification system 104 to provide a classification model 112 that satisfies one or more criteria for processing and classifying data sets. The transaction processing system 102 may include a computer system, application, or other entity that obtains and processes incoming transactions from different sources. For example, as illustrated in FIG. 1, the transaction processing system 102 may process fraudulent transactions from one or more suspicious clients 106 and authentic transactions from authentic clients 108 to generate a data set 110 that includes fraudulent transaction data and authentic transaction data. The transaction processing system 102 may have previously performed a classification of the data points within the data set, such that each data point of the data set 110 is known as either corresponding to an authentic transaction or a fraudulent transaction. Thus, the data set 110 generated by the transaction processing system 102 may be used to evaluate performance of various classification models. In some instances, the data set 110 may be a training data set 110 comprising data points corresponding to simulated transactions that may be classified as either being authentic or fraudulent.

In an embodiment, the data set 110 comprises imbalanced data. Imbalanced data refers to a classification problem where the classes (e.g., fraudulent transactions and authentic transactions, as illustrated in FIG. 1) are not represented in an equal manner. For instance, the number of fraudulent transactions processed by the transaction processing system 102 may be several orders of magnitude lower than the number of authentic transactions processed by the transaction processing system 102. In other words, the number of observed transactions that are not fraudulent may far outweigh the number of observed transactions that are fraudulent. Thus, the data points corresponding to authentic transactions may correspond to a majority class, whereas the data points corresponding to fraudulent transactions may correspond to a minority class. It should be noted that while financial transactions are used extensively throughout the present disclosure for the purpose of illustration, other forms of data may be used to construct the data set 110 and to perform evaluations of different classification models subject to criteria tied to the type of data utilized.

It should be noted that while the data set 110 may be provided by the requestor (e.g., transaction processing system 102), the data set 110 may be obtained from alternative sources. For instance, the request may alternatively specify a location (e.g., network address, etc.) where the data set 110 may be obtained. In some instances, the transaction processing system 102 may indicate, in the request, that the transaction classification system 104 is to use a sample data set maintained by the transaction classification system 104 for the training and evaluation of various classification models. In some instances, the request may specify what type of data set is to be used (e.g., data sets including transaction data, data sets including other data, etc.). This may cause the transaction classification system 104 to obtain the data set 110 from a data repository maintained by the transaction classification system 104 or from a third-party provider that maintains sample data sets for use in evaluating the performance of various classification models.

In an embodiment, the transaction processing system 102 provides, in its request to the transaction classification system 104, the data set 110 and a set of criteria for evaluating a classification model to be generated in response to the request. The set of criteria may include a threshold cost per transaction resulting from misclassification of fraudulent transactions as being authentic (e.g., false negative classifications) and from misclassification of authentic transactions as being fraudulent (e.g., false positive classifications). Additionally, or alternatively, the set of criteria may include a threshold for the accuracy of the desired classification model in classifying the various data points as corresponding to either fraudulent transactions or authentic transactions. The set of criteria may include additional and/or alternative metrics that may be used by the transaction classification system 104 to identify a desired classification model 112. In some instances, the set of criteria may set forth a requirement that the desired classification model 112 is to outperform (e.g., produce a lower cost per transaction, etc.) one or more commercially available or other benchmark classification models. For instance, the transaction classification system 104, based on the set of criteria, may use commercially available or other control machine learning models trained to perform logistic regression using a standard "0-1" loss and trained using down-sampled and balanced data to generate benchmark outputs that may be used to determine the performance of the classification model 112.

In response to the request, the transaction classification system 104 may generate an initial iteration of the classification model 112. The transaction classification system 104 may initialize a set of model coefficients $\{\alpha_1, \alpha_2, \alpha_3, \ldots \alpha_n\}$ randomly according to a Gaussian distribution with low variance centered around zero. Using this initial iteration of the classification model 112, the transaction classification system 104 may process the data set 110 to generate an output. This output may specify the classifications for each of the various data points of the data set 110. Further, the transaction classification system 104 may compare the output generated using the initial iteration of the classification model 112 to the classifications defined in the data set 110 for each of the data points to identify any misclassifications.

In an embodiment, the transaction classification system 104 generates a modified loss function that can be used to calculate a quantifiable loss resulting from misclassification of one or more data points of the data set 110. As an illustrative example, if the set of criteria are tied to a cost resulting from misclassification of fraudulent transactions as being authentic and of authentic transactions as being fraudulent, the transaction classification system 104 may replace error from the loss function with a monetary amount corresponding to the cost per transaction (e.g., data point). The modified loss function may include a cost weight that is based on the transaction fee generated as a result of a misclassification of authentic transactions as being fraudulent (e.g., false positive cost) and on a cost resulting from an error in misclassifying fraudulent transactions as being authentic (e.g., false negative cost). Thus, the cost weight can represent how much money is lost by being incorrect in the classification of the data points. This cost weight may be multiplied by an expression that represents the extent to which the classification of a data point differs from its true classification (e.g., classification error). The resulting output of this loss function may represent the expected average cost due per transaction resulting from misclassification of these transactions. This output may be compared to the cost threshold defined as the criteria in the request to determine whether the classification model satisfies this criteria. It should be noted that while costs are used extensively throughout the present disclosure at a metric for determining whether the set of criteria specified in the request are satisfied, other metrics may be used to estimate the impact of misclassifying data points of the data set.

If the set of criteria specify that the classification model 112 is to outperform (e.g., produce a lower cost) one or more existing classification models, the transaction classification system 104 may utilize the modified loss function to evaluate the output of each of these one or more existing classification models and determine a resultant quantifiable loss (e.g., cost) produced by each of these one or more existing classification models. The transaction classification system 104 may compare the quantifiable loss produced by the classification model 112 to the resultant quantifiable loss produced by each of these one or more existing classification models to determine whether the classification model 112 outperforms each of these one or more existing classification models. In an embodiment, to provide additional comparison data points for determining whether the classification model 112 outperforms the one or more existing classification models, the transaction classification system 104 divides the data set 110 into multiple subsets. Each of the multiple subsets may be processed using the classification model 112 and the one or more existing classification models such that a quantifiable loss may be determined for each of the multiple subsets. This allows the transaction classification system 104 to gauge the performance of the classification model 112 using multiple comparisons from a single data set 110.

If the output of the classification model 112 does not satisfy the set of criteria set forth in the request, the transaction classification system 104 may update one or more classification model coefficients to generate an updated classification model. This updated classification model may be used to process the previously obtained data set, as well as any additional data points or data sets provided by the requestor, by a third party, or otherwise obtained by the transaction classification system 104. In some examples, the transaction classification system 104 may use an optimization algorithm to update the classification model coefficients. For instance, the transaction classification system may use gradient descent to update the logistic coefficients of the logistic regression model to enable generation of new cutoff value that may be used to classify the data points of the previously evaluated data set and of any new data points obtained by the transaction classification system. The transaction classification system 104 may use this updated classification model to process the available data points and generate a new output. The transaction classification system may evaluate this new output to determine whether the output satisfies the set of criteria specified in the request.

In an embodiment, if the output generated using the classification model satisfies the set of criteria specified in the request, the transaction classification system 104 provides an output summary and the classification model 112 to the transaction processing system 102 to fulfill the request. The output summary may include various metrics corresponding to the output generated using the classification model. These metrics may include, for the classification model, the total cost or loss resulting from misclassification of data points of the data set 110, the average cost per data point (e.g., transaction, credit account, credit application, etc.) resulting from misclassification of data points of the data set 110, a classification accuracy for the classification model 112, the decrease in cost or other quantifiable loss compared to that of any existing classification models, and the like.

In an embodiment, the transaction classification system 104 provides the classification model 112 in the form of an application or other executable instructions that can be implemented by the requestor to process other data sets using the classification model. This application or other executable instructions may be used to classify data points from a data set and identify any desired metrics corresponding to this classification. For instance, for a particular data set, a user of the application or other executable instructions may determine the expected cost of erroneous classification of the data points of the provided data set, thus providing a quantifiable measure of the impact of such misclassification of data.

Figure 2:
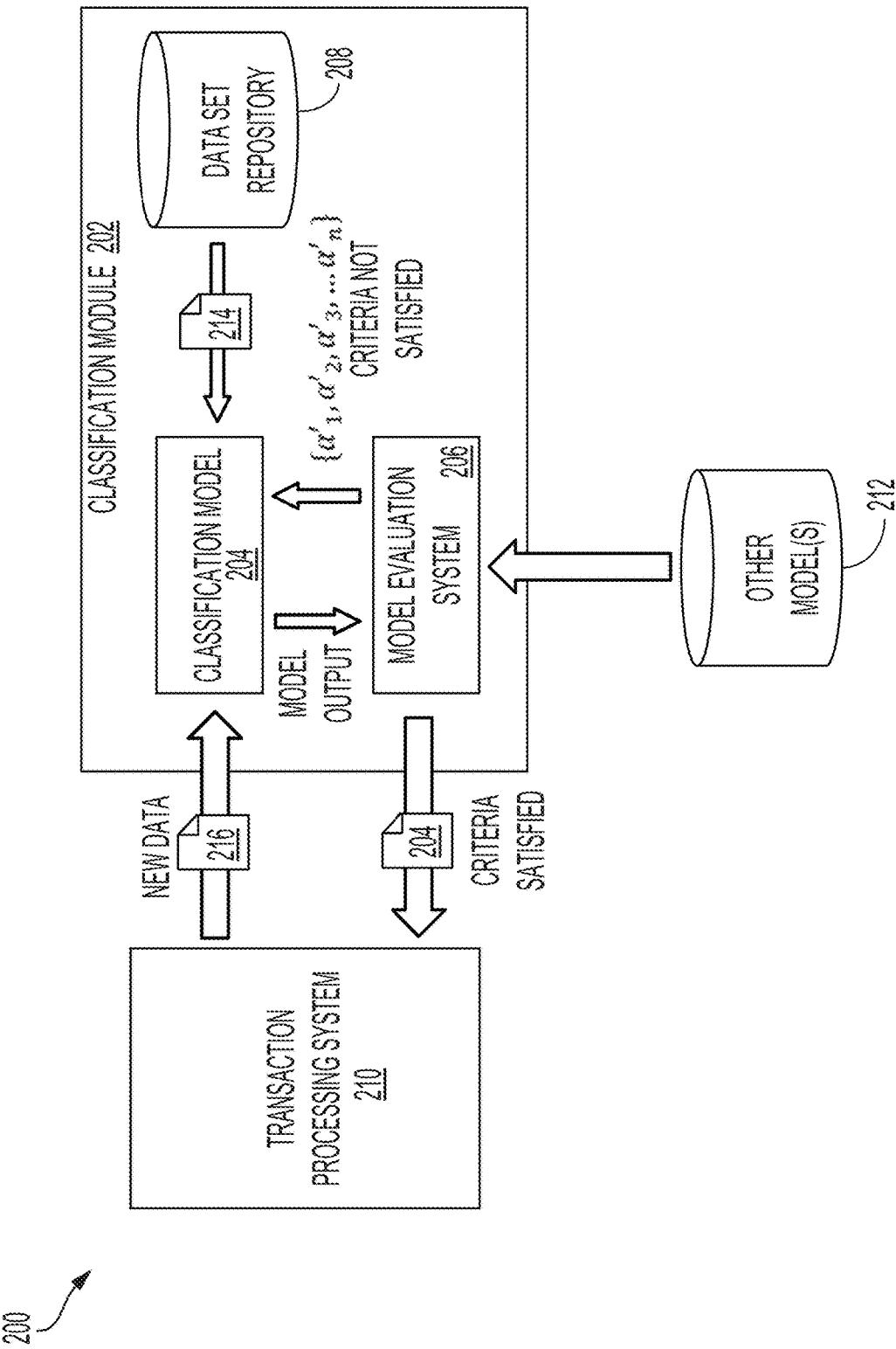
FIG. 2 shows an illustrative example of an environment in which a classification module of a transaction classification system generates and trains a classification model to satisfy one or more criteria for the classification of imbalanced data in accordance with at least one embodiment.

FIG. 2 shows an illustrative example of an environment 200 in which a classification module 202 of a transaction classification system generates and trains a classification model 204 to satisfy one or more criteria for the classification of imbalanced data in accordance with at least one embodiment. In an embodiment, the transaction classification system obtains a request to provide a classification model that satisfies one or more criteria. For instance, the request may specify that a resulting cost per transaction for the classification model is to be below a threshold cost value selected by the requestor (e.g., transaction processing system, etc.). Additionally, or alternatively, the request may specify that the classification model is to outperform one or more existing classification models that are commercially available for the classification of transaction data into a majority class (e.g., authentic transactions, etc.) or a minority class (e.g., fraudulent transactions, etc.).

The request may include an initial data set that may be processed using the classification model 204 to determine whether the classification model 204 satisfies the one or more criteria set forth in the request. The initial data set may be a training data set comprising a set of data points corresponding to authentic transactions and to fraudulent transactions. More generally, the set of data points may be known to be either part of a majority class or of a minority class. Thus, processing of the initial data set using a classification model may yield and output that may be compared to the known classifications of the data points to identify any misclassifications generated by the classification model. In some instances, the initial data set may comprise actual data aggregated by the transaction processing system 210 or other entity via processing of actual transactions, credit applications, credit accounts, and the like. In an embodiment, the classification module 202 obtains the initial data set from a public repository of data sets usable for training machine learning models (e.g., Kaggle Open Datasets, etc.). This training data set may include data points in a format similar to the data that is to be used by the transaction processing system 210 or other entity to classify the data.

In response to the request from the transaction processing system 210, the classification module 202 generates an initial iteration of the classification model 204. The classification module 202 may initialize a set of model coefficients $\{\alpha_1, \alpha_2, \alpha_3, \ldots \alpha_n\}$ randomly according to a Gaussian distribution with low variance centered around zero. These model coefficients may correspond to the input space of the training data set. For instance, if the input space is $\mathbb{R}^{30}$, where each of the variables except transaction amount is anonymous and min-maxed normalized, the number of model coefficients that may be used to initialize and train the classification model 204 may correspond to a set $\mathbb{R}^{31}$. More generally, the number of model coefficients may be equal to K+1, where K denotes the size of the input space.

In an embodiment, the classification model 204 is obtained by training the set of model coefficients $\{\alpha_1, \alpha_2, \alpha_3, \ldots \alpha_n\}$ in the expression:

$$\tilde{y}(x) := \frac{1}{1 + e^{\Sigma \alpha_j x_j}} \quad \text{(Eq. 1)}$$

where $x \in \mathbb{R}^{K+1}$, $x_j$ denotes the jth component, and $x_0=1$. The function $\tilde{y}: X \rightarrow \mathbb{R}^{>0}$ represents the probability that an input value x of domain space X has a classification y(x)=1. From this probability, classification prediction may be performed using a cutoff: $\tilde{y}(x) > \bar{p}$ induces output prediction $\hat{y}(x)=1$, while $\tilde{y}(x) \leq \bar{p}$ results in $\hat{y}(x)=0$, where $\hat{y}$ denotes a binary decision made from the probability denoted in Eq. 1 and $\bar{p}$ is the cutoff value. Values close to the cutoff value may be interpreted as those for which there is no significant certainty with regard to misclassification of particular data points.

In order to train the set of model coefficients $\{\alpha_1, \alpha_2, \alpha_3, \ldots \alpha_n\}$, a loss function is used. In an embodiment, the loss function is used to quantify the loss resulting from misclassification of data points of the input data set (e.g., training data set). The original loss function, $\mathcal{L}_s$ may be optimized using gradient descent, wherein:

$$\mathcal{L}_s := \frac{1}{m} \sum_{i=1}^{m} (y(x^i) - \hat{y}_s(x^i))^2 \quad \text{(Eq. 2)}$$

which represents the squared classification error for the various data points of the training data set. In an embodiment, the transaction classification system modifies the loss function defined in Eq. 2 in order to obtain a quantifiable loss rather than an esoteric statistical quantity that may not demonstrate the actual impact of misclassifying any of the data points in the training data set. For instance, the loss function defined in Eq. 2 may be modified to include a cost weighing component corresponding to the cost or loss resulting from false positive and false negative classifications:

$$\mathcal{L}_s^d := \frac{1}{m} \sum_{i=1}^{m} (y(x^i) - \hat{y}_s(x^i))^2 (\tau(x^i) I_{y=0}(x^i) + \pi(x^i) I_{y=1}(x^i)) \quad \text{(Eq. 3)}$$

where $x^i$ represents the ith data point in a training data set S, and I represents the indicator function:

$$I_{condition}(x) = \begin{cases} 1 & \text{if } x \text{ satisfies condition,} \\ 0 & \text{else} \end{cases} \quad \text{(Eq. 4)}$$

$\tau$ denotes an assumed constant transaction fee resulting from a false positive classification of a data point and $\pi$ denotes the price of the ith transaction resulting from a false negative classification of a data point. Thus, the cost weighting component of the modified loss function may provide a quantifiable measure of the loss resulting from misclassification of data points of the training data set. The values of $\tau$ and $\pi$ may be set based on statistical analysis of previously processed data (e.g., transactions, credit applications, credit accounts, etc.), whereby the cost of false positive classifications and false negative classifications may be known. Alternatively, these values may be initially assumed and later adjusted subject to further analysis of data sets over time.

In an embodiment, the classification module 202 processes the training data set using the initial iteration of the classification model 204 to generate an output that may be evaluated by the model evaluation system 206 using Eq. 3 to determine the quantifiable loss resulting from misclassification of one or more data points of the training data set. Additionally, the model evaluation system 206 may determine whether the resulting quantifiable loss satisfies the set of criteria specified in the request to obtain the classification model 204. For example, if the set of criteria include a requirement that the quantifiable loss resulting from the classification of data points of the training data set is not to exceed a loss threshold, the model evaluation system 206 may evaluate the determined quantifiable loss for the classification model 204 to determine whether this loss exceeds the specified loss threshold. If so, the model evaluation system 206 may determine that the model coefficients $\{\alpha_1, \alpha_2, \alpha_3, \ldots \alpha_n\}$ are to be updated for the classification model 204.

As another example, if the set of criteria specify that the classification model 204 is to produce an output that results in a lower quantifiable loss compared to one or more other classification models, the model evaluation system 206 may obtain, from a model repository 212, one or more existing classification models that may serve as a baseline for determining the performance of the classification model 204. The one or more existing classification models may include commercially available or other control machine learning models trained to classify the data set subject to a standard loss function. For instance, the classification module 202 may use a commercially available or other control machine learning model trained to perform logistic regression using a standard "0-1" loss and trained using down-sampled and balanced data to generate an additional classification output. Using the output from the one or more existing classification models from the model repository 212, the classification module 202 may calculate, using the modified loss function, the quantifiable loss resulting from misclassification of one or more data points of the training data set for each of these models. The quantifiable losses may be compared to the quantifiable loss obtained using the classification model 204 generated by the classification module 202 to determine whether the classification model 204 outperforms the commercially available or other control machine learning models (e.g., produces a lower cost per transaction, produces a lower total cost, etc.). If the classification model 204 fails to outperform the one or more existing classification models, the model evaluation system 206 may update the model coefficients of the classification model 204.

If the model evaluation system 206 determines that the model coefficients of the classification model 204 are to be updated as a result of the classification model 204 failing to satisfy the set of criteria, the model evaluation system 206 may utilize stochastic gradient descent to update the set of model coefficients. For instance, the model evaluation system 206 may update each model coefficient using the following calculation:

$$\alpha_i - \lambda \frac{\partial \mathcal{L}_s^d}{\partial \alpha_i}\bigg|_{x^i} \rightarrow \alpha_i \qquad \text{(Eq. 5)}$$

where $\alpha_i$ represents the model coefficients of the classification model 204 and $\lambda$ denotes the learning rate for the classification model 204. The learning rate may be set to an initial value (such as between 0 and 1) and adjusted based on evaluation of the output of the classification model 204 and the resulting quantifiable loss determined from the output. The updated logistic coefficients $\{\alpha'_1, \alpha'_2, \alpha'_3, \ldots \alpha'_n\}$ and, if applicable, the new learning rate may be implemented by the classification module to generate an updated classification model.

The classification module 202 may utilize the previously processed data sets 214 from a data set repository 208 (including the training data set provided in the request) and any new data sets 216 obtained from the requestor or other sources as input to the updated classification model to generate a new output. The model evaluation system 206 may evaluate this new output to determine whether the new output satisfies the one or more criteria defined in the request to provide a classification model that satisfies the one or more criteria. The model evaluation system 206 may continue to modify the model coefficients $\{\alpha_1, \alpha_2, \alpha_3, \ldots \alpha_n\}$ while the one or more criteria remain unsatisfied or until a determination is made that a classification model that satisfies the one or more criteria cannot be generated (e.g., a maximum number of iterations have been performed, the set of criteria are determined to be unrealistic, etc.).

If the model evaluation system 206 determines that the classification model 204 satisfies the set of criteria set forth in the request, the model evaluation system 206 may provide the classification model 204 to the transaction processing system 210 to fulfill the request. In an embodiment, the transaction processing system 210 can provide new data 216 to the classification module 202 that can be used to determine the performance of the classification model 204 and, if required, to update the classification model 204 to ensure that the classification model 204 continues to satisfy the set of criteria in the original request. For instance, the classification module 202 may process the newly obtained data 216 from the transaction processing system 210 using the classification model 204 to generate a new output. In some instances, the classification module 202 may divide the newly obtained data 216 into multiple subsets. Each subset may correspond to a time segment during which the data within the subset was obtained. For example, if the new data 216 includes data obtained over a period of several months, the new data 216 may be divided into subsets, wherein each subset corresponds to a particular month of the data collection period. This may allow for additional evaluations of the performance of the classification model 204 for the set of criteria.

The model evaluation system 206 may evaluate the output from the classification model 204 to determine whether the classification model 204 is producing an output that satisfies the set of criteria for the new data 216. This may include processing the new data 216 using the one or more existing classification models from the model repository 212 and comparing the quantifiable losses from these one or more existing classification models to that of the classification model 204. In some instances, the new data 216 may be provided with a new loss threshold that is not to be exceeded by the classification model 204. Thus, the model evaluation system 206 may evaluate the quantifiable loss resulting from processing of the new data 216 using the classification model 204 to determine whether this quantifiable loss exceeds the new loss threshold. If the model evaluation system 206 determines, based on the evaluation of the new output generated using the new data 216, that the classification model 204 no longer satisfies the set of criteria, the model evaluation system 206 may update the model coefficients of the classification model 204 and utilize the updated classification model to generate a new output. The model evaluation system 206 may continue this iterative process until a classification model 204 is obtained that satisfies the set of criteria. The model evaluation system 206 may provide the updated classification model to the transaction processing system 210 in order to allow the transaction processing system 210 to utilize this updated classification model for processing incoming data (e.g., transactions, credit applications, credit accounts, etc.).

Figure 3:
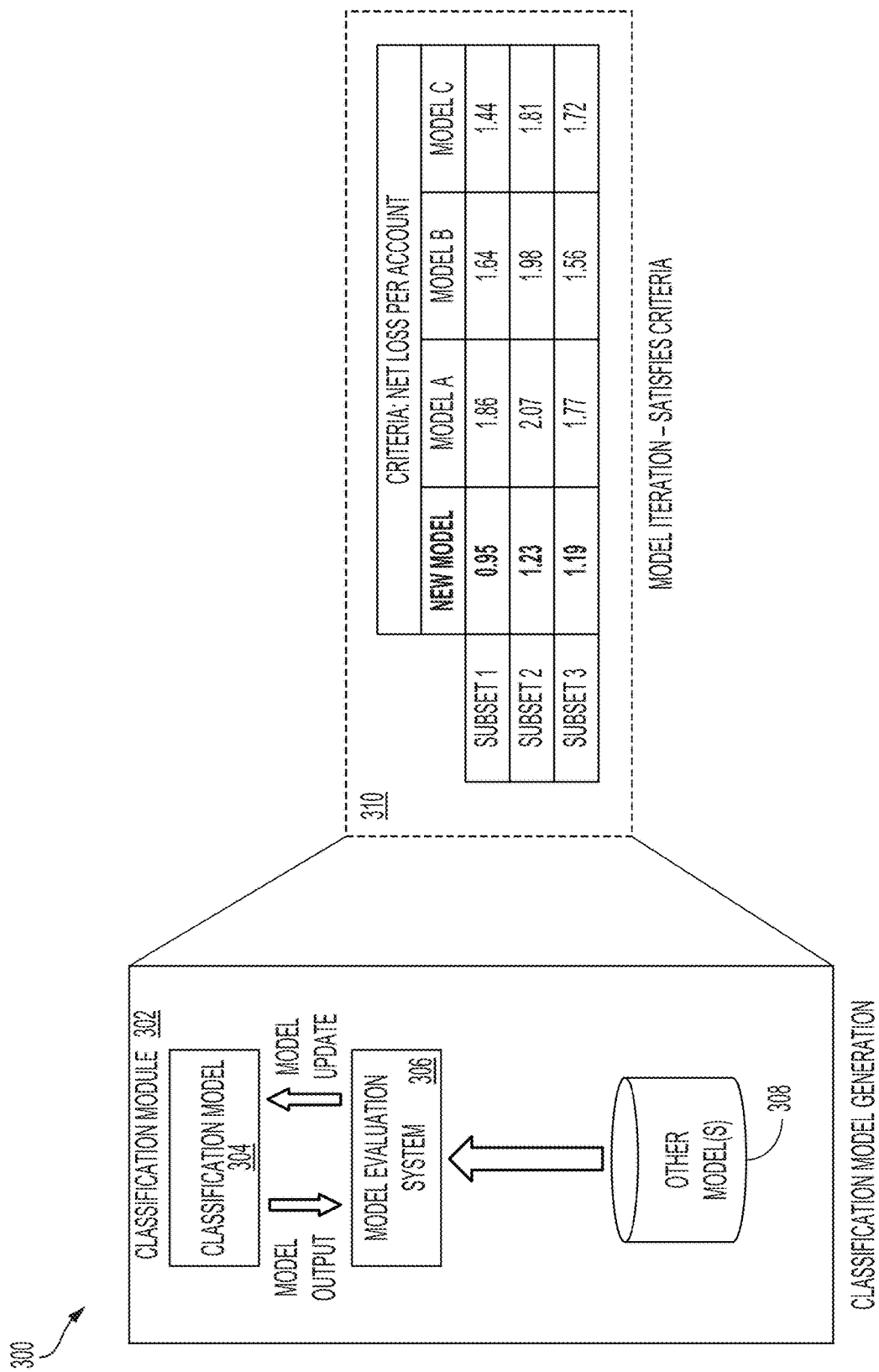
FIG. 3 shows an illustrative example of an environment in which a classification module of a transaction classification system evaluates the performance of a classification model against the performance of other classification models for one or more criteria to train the classification model in accordance with at least one embodiment.

FIG. 3 shows an illustrative example of an environment 300 in which a classification module 302 of a transaction classification system evaluates the performance of a classification model 304 against the performance of other classification models 308 for one or more criteria to train the classification model 304 in accordance with at least one embodiment. In the environment 300, the classification module 302 generates an initial version of the classification model 304 to begin processing a training data set for the training of the classification model 304. For instance, the classification module 302 may initialize the model coefficients $\{\alpha_1, \alpha_2, \alpha_3, \ldots \alpha_n\}$ randomly according to a Gaussian distribution with low variance centered around zero. Additionally, the classification module 302 may obtain the training data set that is to be used to train the classification model 304. For instance, the classification module 302 may obtain the training data set from a public repository of data sets usable for training machine learning models (e.g., Kaggle Open Datasets, etc.). This training data set may include data points in a format similar to the data that is to be used by the requestor to classify the data. In other instances, the training data set may be provided by the requestor (e.g., transaction processing system, administrator of the transaction processing system, etc.), which may include previously obtained data that has been classified according to either a majority class (e.g., authentic transactions, active accounts, etc.) or a minority class (e.g., fraudulent transactions, delinquent or blocked accounts, etc.). Using this initial iteration of the classification model 304, the classification module 302 may utilize the training data set as input to the classification model 304 to generate a model output. This model output may include classifications of the various data points of the training data set corresponding to either a majority class or a minority class.

In an embodiment, the model output generated using the classification model 304, as well as the original training data set, is provided to a model evaluation system 306 to determine whether the output generated by the classification model 304 satisfies a set of criteria. As noted above, the set of criteria may specify a requirement that the resulting quantifiable loss (e.g., cost per transaction, total cost, etc.) does not exceed a loss threshold (e.g., a maximum allowable cost per transaction, a maximum allowable cost, etc.) for the training data set. For instance, in the request to generate the classification model 304, a requestor may determine a loss threshold based on the known losses generated via previous classification of the data points in the training data set. For instance, if the training data set includes data points corresponding to previously processed transactions, the requestor may know the resulting quantifiable loss resulting from misclassification of one or more data points, such as a false positive determination (e.g., an authentic transaction is erroneously classified as being fraudulent, etc.) or a false negative determination (e.g., a fraudulent transaction is erroneously classified as being authentic, etc.). The known quantifiable loss may be used to define the loss threshold for determining whether the classification model 304 is acceptable for use in classifying data of the same type as the training data set.

In an embodiment, the request to generate the classification model 304 further specifies one or more assumptions for the cost of each type of misclassification that may be used to determine a quantifiable loss for the classification model 304. For instance, if the classification model 304 is being generated to classify transactions as being either authentic or fraudulent, for a false positive determination, the requestor may define the cost of a false positive determination as the market cost of review resulting from the misclassification of an authentic transaction as being fraudulent. Further, for a false negative determination, the requestor may define the cost of a false negative determination as the gross fraud amount of a transaction, on average, that is written off. As another example, if the classification model 304 is being generated to classify credit applications for approval as being either authentic or fraudulent, for a false positive determination (e.g., a legitimate account is misclassified as being fraudulent or delinquent), the requestor may define the cost of a false positive determination as the annual percentage rate multiplied by the average running balance and the life of the account. Further, for a false negative determination, the requestor may define the cost of a false negative determination as the writeoff amount for the account.

The classification module 302 may utilize the one or more assumptions for the cost of each type of misclassification to modify the loss function that is to be used to train the classification model 304. For instance, the loss function may be modified such that the classification error is multiplied by either a false positive or false negative cost resulting from the misclassification of a data point. As a result of the classification error being multiplied by a weighted cost (e.g., misclassification cost for a data point), the resulting loss itself is a cost or other quantifiable measure rather than an empirical loss value. The model evaluation system 306 may utilize this modified loss function to calculate the resulting cost or other quantifiable loss generated by the classification model 304 as a result of misclassification of one or more data points of the training data set.

In an embodiment, the set of criteria provided by the requestor can specify that the classification model 304 is to outperform one or more existing classification models (e.g., commercially available machine learning models, control/baseline machine learning models, etc.) with regard to one or more metrics (e.g., resulting cost per transaction, resulting total cost, etc.). The existing classification models may be maintained by the classification module 302 in a model repository 308 and/or may be obtained from another source (e.g., a vendor of a specified, commercially available classification model, etc.). In response to obtaining the model output from the classification model 304, the model evaluation system 306 may process the training data set using one or more existing classification models from the model repository 308 and/or from other sources to generate additional outputs that may be compared to the output of the classification model 304. For instance, using the modified loss function, the model evaluation system 306 may determine the quantifiable loss for each of the other classification models. The quantifiable loss resulting from the output of the classification model 304 may be compared to the quantifiable loss of each of the other classification models utilized by the model evaluation system 306, resulting in a comparison 310. The comparison 310 may be used to determine, for subsets of the training data set, whether the classification model 304 outperforms the other classification models utilized by the model evaluation system 306 to establish a baseline for the classification model 304.

As illustrated in FIG. 3, the comparison 310 is based on the net loss per account resulting from misclassification of data points (e.g., accounts) of the training data set. Further, as illustrated in FIG. 3, the comparison 310 indicates that the classification model 304 (e.g., "New Model") has produced a lower net loss per account for each of the training data set subsets compared to that of the other classification models utilized by the model evaluation system 306. This may serve as an indication that the new classification model 304 satisfies at least a criteria that the classification model 304 is to outperform the other existing classification models identified in the request or otherwise available to the model evaluation system 306 for evaluation. If, based on the comparison between the classification model 304 and the one or more other classification models, the model evaluation system 306 determines that the classification model 304 satisfies the set of criteria set forth in the request to generate the classification model 304, the model evaluation system 306 may provide the classification model 304 for use in processing new data.

In an embodiment, if the model evaluation system 306 determines that the classification model 304 does not satisfy one or more criteria of the set of criteria specified in the request (e.g., the classification model 304 does not outperform existing classification models, the quantifiable loss resulting from the output of the classification model 304 exceeds a loss threshold, etc.), the model evaluation system 306 may update the classification model 304 to generate a new iteration of the classification model 304. For instance, the model evaluation system 306 may update, based on the output produced using the initial classification model and the one or more criteria, one or more of the set of initial model coefficients to yield a new set of coefficients $\{\alpha'_1, \alpha'_2, \alpha'_3,$ . . . $\alpha'_n$}. Implementation of this new set of coefficients may result in an updated classification model. The new set of coefficients may be generated using stochastic gradient descent subject to a pre-determined learning rate.

The classification module 302 may process the training data set using the updated classification model to generate a new output that may be evaluated by the model evaluation system 306 to determine whether the new output satisfies the set of criteria set forth in the request. The model evaluation system 306 may calculate a new quantifiable loss for the new classification model output and compare this new quantifiable loss to the quantifiable losses for the existing classification models used as a baseline. Additionally, or alternatively, the model evaluation system 306 may determine whether the new quantifiable loss exceeds a loss threshold specified in the set of criteria provided in the request. If the updated classification model does not satisfy the set of criteria, the model evaluation system 306 may again update the set of model coefficients to yield another new set of coefficients. This iterative process of updating the model coefficients of the classification model 304 may continue until a classification model 304 is generated that satisfies the set of criteria set forth in the request or it is determined that a classification model that satisfies the set of criteria cannot be created (e.g., a maximum number of iterations have been performed, the set of criteria are determined to be unrealistic, etc.). If a classification model 304 is generated that satisfies the set of criteria, the model evaluation system 306 may provide the classification model 304 to fulfill the request.

Figure 4:
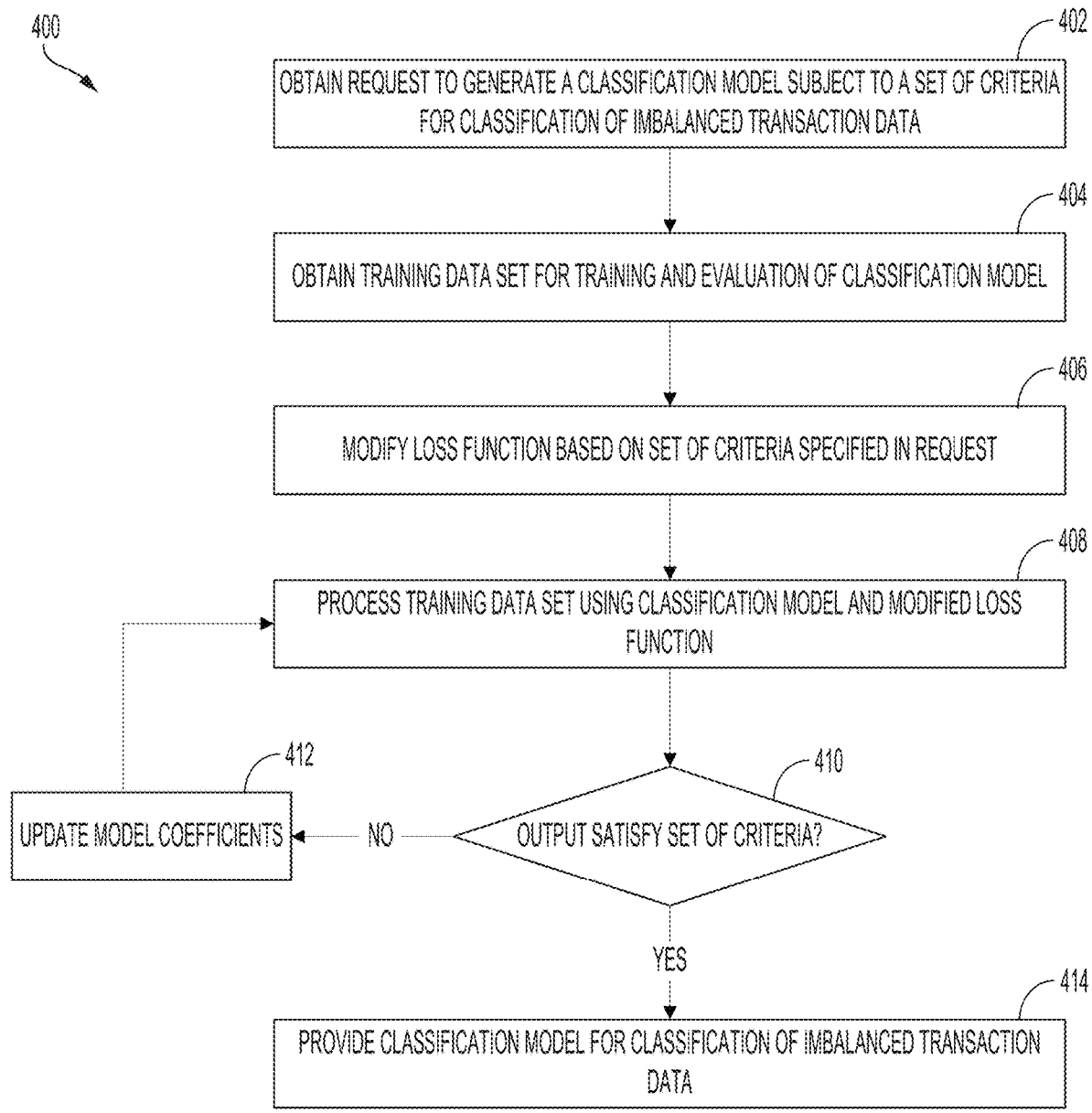
FIG. 4 shows an illustrative example of a process for training a classification model using a training data set and a loss function modified based a set of criteria for classification of imbalanced transaction data in accordance with at least one embodiment.

FIG. 4 shows an illustrative example of a process 400 for training a classification model using a training data set and a loss function modified based a set of criteria for classification of imbalanced transaction data in accordance with at least one embodiment. The process 400 may be performed by a classification module of a transaction classification system, which may generate a classification model for classifying imbalanced transaction data and trained using a modified loss function. The classification model, in an embodiment, is a logistic regression model used to generate, for each data point, a probability that a data point has a particular classification. From this probability, the classification module, via the classification model and a cutoff value, may classify each data point as being either corresponding to an "authentic transaction" or to a "fraudulent transaction." More generally, the classification model may be used to perform binary classification of the various data points from the data set. While logistic regression is used extensively throughout the present disclosure for the purpose of illustration, other models may be used in the classification of the various data points of the data set. Other models may include random forest models, Naïve Bayes models, linear regression models, decision tree models, K-Means clustering models, kNN models, SVM models, gradient boosting machine models, and the like.

At step 402, the classification module obtains a request to generate a classification model subject to a set of criteria for the classification of imbalanced transaction data. The set of criteria may include a requirement that a total quantifiable loss resulting from misclassification of the data points of a training data set is not to exceed a total loss threshold. Similarly, the set of criteria may include a requirement that a quantifiable loss per data point (e.g., average quantifiable loss) is not to exceed an average loss threshold. In some instances, the set of criteria may include a requirement that the classification model that is to be generated by the classification module is to provide better performance compared to other machine learning models (e.g., commercially available machine learning models, etc.) in reducing the quantifiable loss (e.g., total loss, average loss, etc.) resulting from misclassification of the data points of a training data set. The set of criteria may be provided in the request from the transaction processing system or other entity that may want to obtain a classification model in order to classify imbalanced data while minimizing one or more quantifiable losses.

As noted above, a quantifiable loss may include a monetary amount lost as a result of misclassification of a data point. For instance, the quantifiable loss may be defined as an expected monetary loss per data point (e.g., transaction). As an example, a fraudulent transaction that is misclassified as being authentic (e.g., false negative) may result in a cost equal to the total price of the transaction. Further, an authentic transaction that is misclassified as being fraudulent (e.g., false positive) may result in another cost that, while seemingly negligible, may still be a positive value. The costs associated with the misclassification of data points (e.g., transactions, accounts, etc.) may be determined via empirical analysis of prior data sets, whereby the cost resulting from misclassification may be determined statistically or through other methods. In some instances, the cost for each of a false positive and false negative misclassification may be initially assumed prior to any statistical analysis of the impact of false positive and false negative misclassifications of data points. In an embodiment, the request to generate the classification model may specify, in addition to the set of criteria, the associated costs for misclassifying data points of an imbalanced data set.

At step 404, the classification module obtains a training data set for training and evaluation of the classification model that is to be generated in response to the request. The training data set may be provided by the requestor (e.g., transaction processing system, etc.) and may comprise data points that are known to either belong to a majority data set (e.g., authentic transactions, authentic credit applications, active accounts, etc.) or to a minority data set (e.g., fraudulent transactions, fraudulent credit applications, delinquent or fraudulent accounts, etc.). In an embodiment, the classification module obtained the training data set from a public repository of data sets usable for training machine learning models (e.g., Kaggle Open Datasets, etc.). The training data set from the public repository may include data points in a format similar to the data that is to be used by the requestor to classify the data.

At step 406, the classification module modifies the loss function used to train the classification model based on the set of criteria specified in the request. In an embodiment, the classification module modifies a loss function to incorporate a weighted cost element. The weighted cost element may incorporate a quantifiable false positive cost, wherein a quantifiable cost is assigned to a misclassification of a data point, resulting in a false positive determination (e.g., an authentic transaction is classified as being fraudulent, etc.). The weighted cost element may also incorporate a quantifiable false negative cost, wherein a quantifiable cost is assigned to a misclassification of a data point, resulting in a false negative determination (e.g., a fraudulent transaction is classified as being authentic, etc.). The weighted cost element may be implemented utilizing a quantifiable unit of measure, such as a monetary unit of measure. Thus, the modified loss function may be used to calculate a loss that has the quantifiable unit of measure. As a result, rather than reducing error in classification of the data points of the data set, the modified loss function may be used to minimize the quantifiable loss (e.g., monetary loss, etc.) resulting from misclassification of the data points. As noted above, the cost associated with a false positive and false negative determination may be provided in the request or determined via statistical analysis of previously processed transaction data.

At step 408, the classification module processes the training data set using the classification model and the modified loss function to determine the quantifiable loss resulting from classification of the data points of the data set. For instance, the classification module may initialize the model coefficients of the classification model randomly according to a Gaussian distribution with low variance centered near zero. This may serve as an initial iteration of the classification model that is to be trained to minimize the quantifiable loss obtained via classification of the data points of the training data set. Using this initial iteration of the classification model and the training data set as input, the classification module may obtain an output that includes a classification for each of the data points of the training data set. The classification module may evaluate this output using the modified loss function to determine a quantifiable loss (e.g., monetary cost per data point, total monetary cost, etc.) resulting from misclassification of one or more data points (e.g., false positives and false negatives).

At step 410, the classification module determines whether the output generated using the classification model satisfies the one or more criteria defined in the request to generate the classification model. In an embodiment, the classification module processes the training data set using one or more commercially available or other control machine learning models trained to classify the data set subject to a standard loss function. For instance, the classification module may use a commercially available or other control machine learning model trained to perform logistic regression using a standard "0-1" loss and trained using down-sampled and balanced data. Using the output from this model, the classification module may calculate, using the modified loss function, the quantifiable loss resulting from misclassification of one or more data points of the training data set. This quantifiable loss may be compared to the quantifiable loss obtained using the classification model generated by the classification module to determine whether the classification model outperforms the commercially available or other control machine learning model (e.g., produces a lower cost per transaction, produces a lower total cost, etc.).

In an embodiment, the classification module additionally, or alternatively, determines whether the resulting quantifiable loss calculated using the modified loss function and the output from the classification model exceeds a cost threshold. For instance, the set of criteria may specify a cost threshold that the classification model is not to exceed as a result of classification of the data points in the training data set. The cost threshold may be defined as a total cost resulting from the classification of the data points of the training data set (including any misclassifications resulting in false positives and false negatives) and/or as a cost per data point on average (e.g., transaction, account, application, etc.) resulting from the classification of the data points of the training data set. Thus, the classification module may utilize the modified loss function to calculate the resulting total cost and/or cost per data point on average resulting from the classification of the data points of the training data set. Further, the classification module may compare the resulting total cost and/or the cost per data point on average to determine whether either exceeds the one or more cost thresholds defined via the set of criteria.

If the classification module determines that the classification model has generated an output that does not satisfy the set of criteria specified in the request, the classification module, at step 412, updates the classification model coefficients. For instance, the classification module may update the logistic coefficients of the classification model with gradient descent subject to a learning rate. The learning rate may be set to an initial value (such as between 0 and 1) and adjusted based on evaluation of the output and the resulting quantifiable loss determined from the output. The updated logistic coefficients and, if applicable, the new learning rate may be implemented by the classification module to generate an updated classification model. Thus, once the model coefficients have been updated, the classification module, at step 408, processes the training data set using the updated classification model to generate a new output that may be evaluated using the modified loss function. This iterative process may continue until the output generated by the current iteration of the classification model satisfies the set of criteria set forth in the request.

At step 414, if the classification module determines that the classification model satisfies the set of criteria specified in the request, the classification module may provide the classification model for the classification of imbalanced transaction data to the requestor. For instance, the classification module may provide the newly generated classification model to the transaction processing system to allow the transaction processing system to use the classification model to classify incoming data (e.g., transactions, accounts, credit applications, etc.). The transaction processing system may provide updated transaction data to the classification module over time, which may be used to update the classification model as needed.

Figure 5:
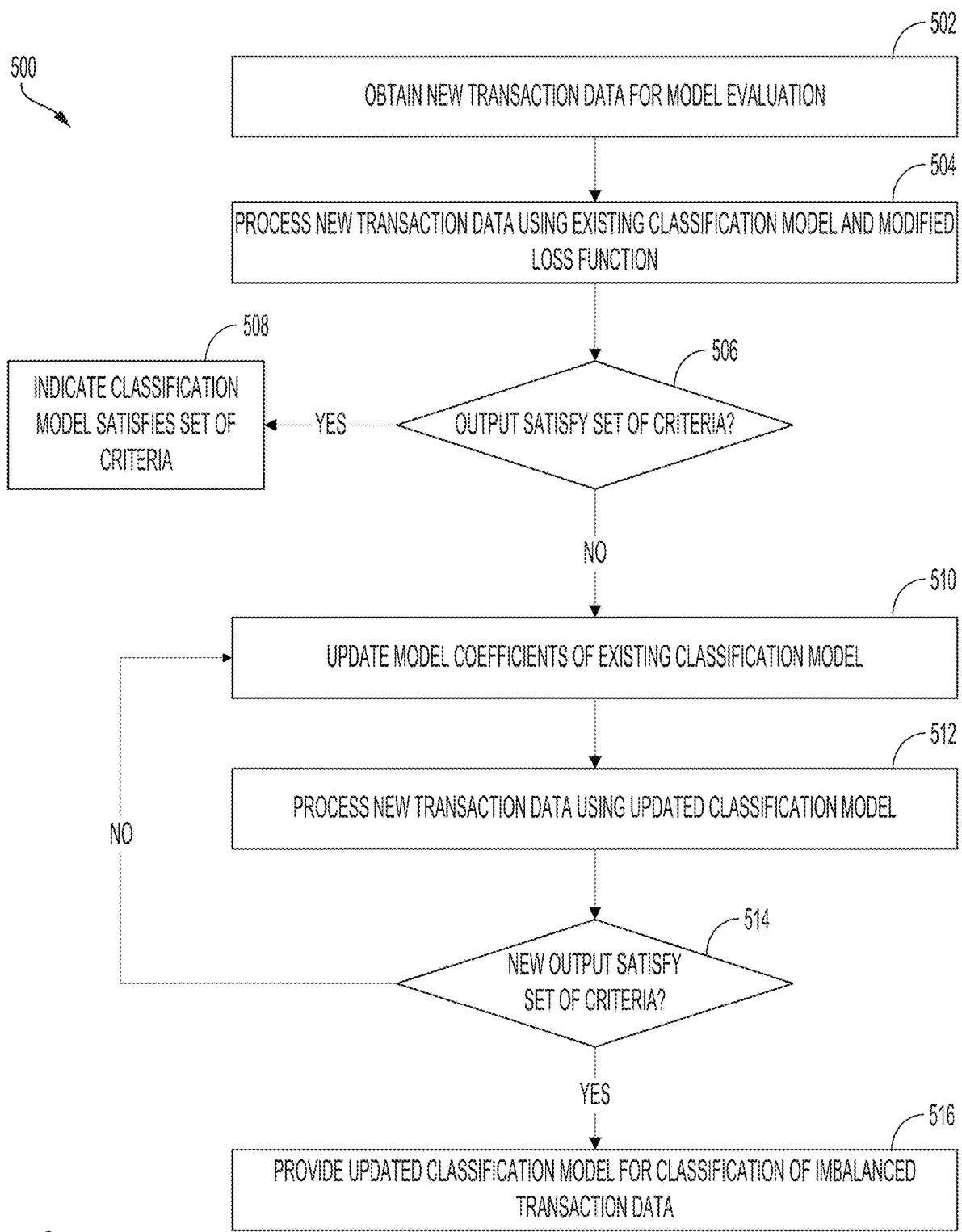
FIG. 5 shows an illustrative example of a process for updating a classification model based on performance of the classification model in classifying new imbalanced transaction data based on a set of criteria in accordance with at least one embodiment.

FIG. 5 shows an illustrative example of a process 500 for updating a classification model based on performance of the classification model in classifying new imbalanced transaction data based on a set of criteria in accordance with at least one embodiment. The process 500 may be performed by a classification module of a transaction classification system, which may utilize an existing classification model trained using a modified loss function to classify transaction data from various sources. For instance, the classification module may obtain transaction data from a transaction processing system. The transaction data may include acquisitions credit approved application data corresponding to approved credit applications. These approved credit applications may be classified as being authentic (e.g., applications submitted by legitimate users) or as being fraudulent (e.g., applications submitted fraudulently by unauthorized users, such as through identity theft, etc.). Alternatively, the transaction data may include acquisitions account data corresponding to existing credit accounts. These existing credit accounts may be classified as being active (e.g., credit accounts in good standing, not delinquent, etc.) or as being delinquent in some form (e.g., written off due to delinquency, blocked as a result of fraud detection, etc.). It should be noted that while transaction data corresponding to a form of financial loss is used extensively throughout the present disclosure for the purpose of illustration, other forms of data may be used to evaluate the performance of a classification model subject to one or more criteria.

At step 502, the classification module of a transaction classification system obtains new transaction data that is to be used to evaluate the performance of an existing classification model trained using a modified loss function. As noted above, the modified loss function is generated to provide a quantifiable measure resulting from misclassification of data in an imbalanced data set. For instance, if the imbalanced data set includes acquisitions credit approved application data corresponding to approved credit applications, the loss function for the classification model may be modified to identify an overall cost resulting from false positives (e.g., authentic applications being classified as being fraudulent) and from false negatives (e.g., fraudulent applications being classified as being authentic). As another example, if the imbalanced data set includes acquisitions account data corresponding to existing credit accounts, the loss function for the classification model may be modified to identify an overall cost resulting from active accounts being classified as being fraudulent, resulting in these accounts being blocked or terminated, and from delinquent accounts being classified as being active, whereby fraudulent activity or delinquency is permitted to continue.

Using the modified loss function, a classification model may be trained such that the classification model produces an output that satisfies one or more criteria. For instance, the one or more criteria may include a requirement that the cost resulting from misclassification of data from a data set is below a certain threshold. This threshold may be determined based on the previous cost resulting from misclassification of data using other machine learning models or techniques. In some examples, the one or more criteria may include a requirement that the cost resulting of misclassification of data from a data set by the classification model is to be below that of other commercially available machine learning models generated for the purpose of classifying imbalanced data of the type obtained by the transaction processing system and provided to the transaction classification system. This cost may correspond to a write-off cost per account, a total write-off cost across all accounts represented in the data set, a total net loss resulting from write-off costs and costs resulting from blocked profit-generating accounts, a net loss per account, a true name fraud loss per account, and the like.

The new transaction data may include data aggregated by an entity (e.g., a financial institution, credit agencies, etc.) over a period of time. For instance, the new transaction data may include acquisitions credit approved application data or acquisitions account data obtained over a particular time period (e.g., one or more months, a quarterly period, a yearly period, etc.). The data may be organized into sub-periods (e.g., per month, per quarter, etc.) such that the transaction data may be divided into subsets corresponding to these sub-periods for evaluation and validation of the classification model subject to the one or more criteria for each sub-period. This allows for multiple evaluations of the classification model using a transaction data set.

At step 504, the classification module processes the newly obtained transaction data using the existing classification model and the modified loss function. For instance, the classification module may process each subset of the new transaction data set using the existing classification model to obtain an output. The output may include a classification of each data point (e.g., credit account, credit application, etc.) as being majority data (e.g., authentic, active, etc.) or as being minority data (e.g., fraudulent, delinquent, etc.). Further, the classification module may evaluate the output to identify any errors in classification of the various data points of the newly obtained transaction data. For instance, the newly obtained transaction data may indicate the true classification for each data point in the data set. The classification module may compare the output generated by the existing classification model to the actual classifications specified in the newly obtained transaction data to identify any misclassified data points.

In an embodiment, the classification module utilizes the modified loss function to quantify the loss resulting from the classification of the various data points of the newly obtained transaction data. For instance, for a misclassified data point, the classification module may utilize the modified loss function to determine the resulting cost associated with the misclassification of the data point. The modified loss function may be used to quantify a false negative misclassification of a data point (e.g., a fraudulent application is classified as being authentic, etc.) as well as a false positive classification of a data point (e.g., an authentic application is classified as being fraudulent, etc.). The resulting loss calculated using the modified loss function may include the total loss resulting from the misclassification of data points of the newly obtained transaction data, as well as the average loss across all data points. Further, the modified loss function may be used to calculate different quantifiable losses per data subset such that the losses for the various subsets may be used to evaluate the performance of the existing classification model.

At step 506, the classification module determines whether the output generated using the existing classification model satisfies a set of criteria. As noted above, the set of criteria may include a loss threshold, whereby if the resulting loss calculated using the modified loss function exceeds the loss threshold, the existing classification model may be deemed to have failed to satisfy the set of criteria. The loss threshold may be a pre-defined total cost or average cost per data point (e.g., transaction, account, credit application, etc.) incurred as a result of misclassification of one or more data points of the newly obtained transaction data. In some instances, the classification module may evaluate the output of the existing classification model for each subset of the newly obtained transaction data set using the modified loss function to determine whether the output corresponding to any of the subsets of the newly obtained transaction data fail to satisfy the set of criteria. If any of the outputs corresponding to the subsets of the newly obtained transaction data fail to satisfy the set of criteria, the classification module may determine that the existing classification model requires modification in order to satisfy the set of criteria for all subsets of the transaction data.

In an embodiment, the set of criteria includes a requirement that the loss resulting from misclassification of data points from the newly obtained transaction data does not exceed the resulting loss for each of a set of machine learning models commercially available or otherwise trained utilizing alternative methods to classify the transaction data as being of a majority class (e.g., authentic, active, etc.) or of a minority class (e.g., fraudulent, delinquent, etc.). For instance, the classification module may use the newly obtained transaction data as input to each of these machine learning models to obtain an output for each of these machine learning models. The classification model may evaluate the output to identify the resulting quantifiable loss (e.g., cost) resulting from misclassification of data points of the transaction data. For instance, the classification module may determine the total cost or average cost per data point (e.g., transaction, account, credit application, etc.) incurred as a result of misclassification of one or more data points of the newly obtained transaction data. The classification module may compare these loss metrics to those generated using the existing classification model trained using the modified loss function to determine whether the existing classification model produces a lower overall cost or average cost compared to that of the machine learning models commercially available for the classification of transaction data. It should be noted that this criteria may be utilized in conjunction with, or as an alternative to, a threshold cost requirement as specified above.

If the classification module determines that the existing classification model satisfies the set of criteria set forth for the model, the classification module, at step 508, indicates that the classification model satisfies the set of criteria. For instance, the classification module may transmit a notification to the transaction processing system to indicate that the transaction processing system may continue to use the classification model for processing incoming credit applications, processing transactions, evaluating existing credit accounts, or any other function for which a quantifiable loss is to be minimized. In some instances, step 508 may be omitted if the output of the existing classification model satisfies the set of criteria. This may allow the transaction processing system to continue performing any function for which the classification model may be used to classify input without interruption.

If the classification module determines that the existing classification model does not satisfy one or more criteria of the set of criteria, the classification module, at step 510, may update one or more model coefficients of the existing classification model to generate an updated classification model. For instance, the classification module may use gradient descent to update the logistic coefficients of the logistic regression model to enable generation of new cutoff values that may be used to classify the data points of the obtained transaction data set and of any new data points obtained by the classification module.

At step 512, the classification module uses the updated classification model to process the transaction data from the transaction processing system to generate an output that includes a new classification of the various data points of the transaction data. The classification module may evaluate this new output using the modified loss function to determine a resulting quantifiable loss (e.g., total cost resulting from misclassification of data points, average cost per data point from misclassification of data points, etc.) for the transaction data using the updated classification model.

At step 514, the classification module may determine whether the resulting quantifiable loss for the updated classification model satisfies the set of criteria. This determination may be similar to that described above in connection with step 506. For instance, the classification module may evaluate the output of the updated classification model for each subset of the newly obtained transaction data set using the modified loss function to determine whether the output corresponding to any of the subsets of the newly obtained transaction data fail to satisfy the set of criteria. If any output corresponding to the subsets of the newly obtained transaction data fail to satisfy the set of criteria, the classification module may determine that the updated classification model requires further modification in order to satisfy the set of criteria for all subsets of the transaction data. If the set of criteria include a requirement that the classification model is to produce a lower loss or cost from misclassification of the data points of the transaction data compared to that of other, commercially available machine learning models, the classification module may compare the loss calculated using the modified loss function based on the output of the updated classification model to the known loss for the commercially available machine learning models to determine whether the updated classification model produces a lower loss or cost compared to that of the commercially available machine learning models.

If the classification module determines that the updated classification model does not satisfy one or more criteria of the set of criteria, the classification module may return to step 510, whereby the classification module may again update the model coefficients of the classification model, as described above. The classification module may, thus, iteratively update the classification model until the classification model produces an output that, when processed using the modified loss function, results in a cost that satisfies the set of criteria. Once the classification module has produced an updated classification model that satisfies the set of criteria, the classification module, at step 516, provides the updated classification model to the transaction processing system for use in the classification of imbalanced transaction data. The transaction processing system may, thus, utilize the updated classification model to process incoming transactions, credit applications, credit accounts, and the like to detect fraud, delinquency, or any other behavior that may be detrimental to the organization implementing the transaction processing system.

Figure 6:
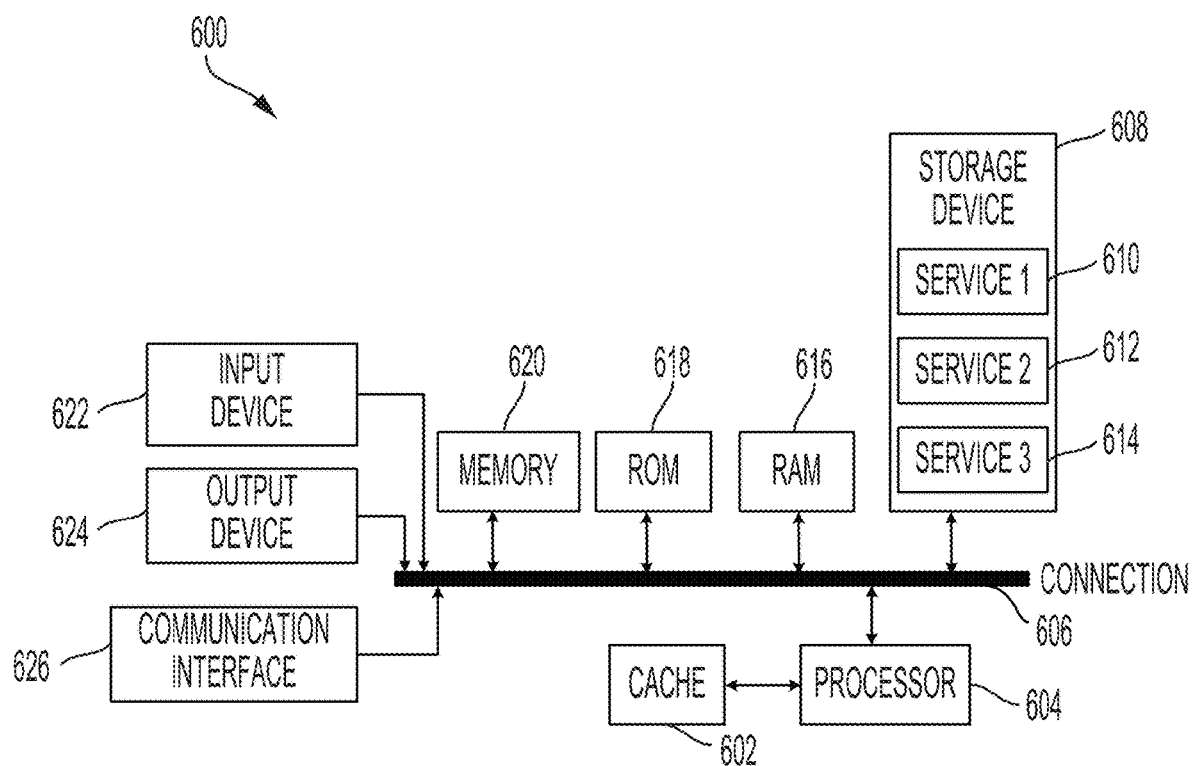
FIG. 6 shows a computing system architecture including various components in electrical communication with each other using a connection in accordance with various embodiments.

FIG. 6 illustrates a computing system architecture 600 including various components in electrical communication with each other using a connection 606, such as a bus, in accordance with some implementations. Example system architecture 600 includes a processing unit (CPU or processor) 604 and a system connection 606 that couples various system components including the system memory 620, such as ROM 618 and RAM 616, to the processor 604. The system architecture 600 can include a cache 602 of high-speed memory connected directly with, in close proximity to, or integrated as part of the processor 604. The system architecture 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions.

Other system memory 620 may be available for use as well. The memory 620 can include multiple different types of memory with different performance characteristics. The processor 604 can include any general purpose processor and a hardware or software service, such as service 1 610, service 2 612, and service 3 614 stored in storage device 608, configured to control the processor 604 as well as a special-purpose processor where software instructions are incorporated into the actual processor design. The processor 604 may be a completely self-contained computing system, containing multiple cores or processors, a bus, memory controller, cache, etc. A multi-core processor may be symmetric or asymmetric.

To enable user interaction with the computing system architecture 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system architecture 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, RAMs 616, ROM 618, and hybrids thereof.

The storage device 608 can include services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

101.121 Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof.

When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
   receiving, by a computer, a request to obtain a classification model that satisfies one or more criteria, wherein the one or more criteria include a quantifiable loss below a threshold value;
   obtaining, by the computer, an imbalanced data set including first data associated with a first characteristic and second data associated with a second characteristic, wherein the imbalanced data set is obtained from a repository of data sets usable for training machine learning models;
   generating, by the computer, a modified loss function to calculate the quantifiable loss, wherein the modified loss function is generated by modifying an original loss function to include a weighing component corresponding to a loss resulting from false positive and false negative classifications, and wherein the original loss function generates an esoteric statistical quantity;
   training, by the computer, an initial iteration of the classification model to generate a classification, wherein the initial iteration is trained by randomly initializing a set of model coefficients corresponding to an input space of the imbalanced data set;
   generating, by the computer, an initial quantifiable loss corresponding to the initial iteration, wherein the initial quantifiable loss is generated using the modified loss function, and wherein the initial quantifiable loss results from a misclassification of the imbalanced data set;
   iteratively training, by the computer, the classification model until a modified classification model is obtained that satisfies the one or more criteria, wherein the classification model is iteratively trained as a result of corresponding quantifiable losses failing to satisfy the one or more criteria, and wherein iteratively training the classification model includes updating the set of model coefficients according to the corresponding quantifiable losses; and
   providing, by the computer, the modified classification model, wherein the modified classification model is provided as a result of a quantifiable loss corresponding to the modified classification model being below the threshold value.

2. The computer-implemented method of claim 1, further comprising:
   obtaining a new imbalanced data set; and
   classifying data points in the new imbalanced data set as being associated with either the first characteristic or the second characteristic, wherein classifying the data points is performed using the modified classification model.

3. The computer-implemented method of claim 1, wherein:
   the first characteristic corresponds to fraudulent transactions processed by a point-of-sale system; and
   the second characteristic corresponds to authenticated transactions processed by the point-of-sale system.

4. The computer-implemented method of claim 1, wherein the set of model coefficients are updated using a gradient descent algorithm.

5. The computer-implemented method of claim 1, further comprising:
   providing output of the modified classification model, wherein the output includes data points organized according to individual associations with the first characteristic and the second characteristic.

6. The computer-implemented method of claim 1, wherein the set of model coefficients are randomly initialized according to a Gaussian distribution with a variance centered around zero.

7. The computer-implemented method of claim 1, wherein the set of model coefficients are updated subject to a pre-determined learning rate.

8. The computer-implemented method of claim 1, wherein the classification model is a logistic regression model, and wherein the logistic regression model generates probabilities that data points have a particular classification.

9. The computer-implemented method of claim 1, wherein imbalanced data set includes a set of data points corresponding to simulated transactions.

10. The computer-implemented method of claim 1, wherein the quantifiable losses correspond to monetary costs resulting from misclassifications of the imbalanced data set.

11. A system, including:
one or more processors; and
memory including instructions that, as a result of being executed by the one or more processors, cause the system to:
receive a request to obtain a classification model that satisfies one or more criteria, wherein the one or more criteria include a quantifiable loss below a threshold value;
obtain an imbalanced data set including first data associated with a first characteristic and second data associated with a second characteristic, wherein the imbalanced data set is obtained from a repository of data sets usable for training machine learning models;
generate a modified loss function to calculate the quantifiable loss, wherein the modified loss function is generated by modifying an original loss function to include a weighing component corresponding to a loss resulting from false positive and false negative classifications, and wherein the original loss function generates an esoteric statistical quantity;
train an initial iteration of the classification model to generate a classification, wherein the initial iteration is trained by randomly initializing a set of model coefficients corresponding to an input space of the imbalanced data set;
generate an initial quantifiable loss corresponding to the initial iteration, wherein the initial quantifiable loss is generated using the modified loss function, and wherein the initial quantifiable loss results from a misclassification of the imbalanced data set;
iteratively train the classification model until a modified classification model is obtained that satisfies the one or more criteria, wherein the classification model is iteratively trained as a result of corresponding quantifiable losses failing to satisfy the one or more criteria, and wherein iteratively training the classification model includes updating the set of model coefficients according to the corresponding quantifiable losses; and
provide the modified classification model, wherein the modified classification model is provided as a result of a quantifiable loss corresponding to the modified classification model being below the threshold value.

12. The system of claim 11, wherein the instructions further cause the system to:
obtain a new imbalanced data set; and
use the modified classification model to classify data points in the new imbalanced data set as being associated with either the first characteristic or the second characteristic.

13. The system of claim 11, wherein:
the first characteristic corresponds to fraudulent transactions processed by a point-of-sale system; and
the second characteristic corresponds to authenticated transactions processed by the point-of-sale system.

14. The system of claim 11, wherein the set of model coefficients are updated using a gradient descent algorithm.

15. The system of claim 11, wherein the instructions further cause the system to:
provide output of the modified classification model, wherein the output includes data points organized according to individual associations with the first characteristic and the second characteristic.

16. The system of claim 11, wherein the set of model coefficients are randomly initialized according to a Gaussian distribution with a variance centered around zero.

17. The system of claim 11, wherein the set of model coefficients are updated subject to a pre-determined learning rate.

18. The system of claim 11, wherein the classification model is a logistic regression model, and wherein the logistic regression model generates probabilities that data points have a particular classification.

19. The system of claim 11, wherein imbalanced data set includes a set of data points corresponding to simulated transactions.

20. The system of claim 11, wherein the quantifiable losses correspond to monetary costs resulting from misclassifications of the imbalanced data set.

21. A non-transitory computer-readable storage medium storing thereon executable instructions that, as a result of being executed by one or more processors of a computer system, cause the computer system to:
receive a request to obtain a classification model that satisfies one or more criteria, wherein the one or more criteria include a quantifiable loss below a threshold value;
obtain an imbalanced data set including first data associated with a first characteristic and second data associated with a second characteristic, wherein the imbalanced data set is obtained from a repository of data sets usable for training machine learning models;
generate a modified loss function to calculate the quantifiable loss, wherein the modified loss function is generated by modifying an original loss function to include a weighing component corresponding to a loss resulting from false positive and false negative classifications, and wherein the original loss function generates an esoteric statistical quantity;
train an initial iteration of the classification model to generate a classification, wherein the initial iteration is trained by randomly initializing a set of model coefficients corresponding to an input space of the imbalanced data set;
generate an initial quantifiable loss corresponding to the initial iteration, wherein the initial quantifiable loss is generated using the modified loss function, and wherein the initial quantifiable loss results from a misclassification of the imbalanced data set;
iteratively train the classification model until a modified classification model is obtained that satisfies the one or more criteria, wherein the classification model is iteratively trained as a result of corresponding quantifiable losses failing to satisfy the one or more criteria, and wherein iteratively training the classification model includes updating the set of model coefficients according to the corresponding quantifiable losses; and provide the modified classification model, wherein the modified classification model is provided as a result of a quantifiable loss corresponding to the modified classification model being below the threshold value.

22. The non-transitory computer-readable storage medium of claim 21, wherein the executable instructions further cause the computer system to:

obtain a new imbalanced data set; and use the modified classification model to classify data points in the new imbalanced data set as being associated with either the first characteristic or the second characteristic.

23. The non-transitory computer-readable storage medium of claim 21, wherein:

the first characteristic corresponds to fraudulent transactions processed by a point-of-sale system; and the second characteristic corresponds to authenticated transactions processed by the point-of-sale system.

24. The non-transitory computer-readable storage medium of claim 21, wherein the set of model coefficients are updated using a gradient descent algorithm.

25. The non-transitory computer-readable storage medium of claim 21, wherein the executable instructions further cause the computer system to:

provide output of the modified classification model, wherein the output includes data points organized according to individual associations with the first characteristic and the second characteristic.

26. The non-transitory computer-readable storage medium of claim 21, wherein the set of model coefficients are randomly initialized according to a Gaussian distribution with a variance centered around zero.

27. The non-transitory computer-readable storage medium of claim 21, wherein the set of model coefficients are updated subject to a pre-determined learning rate.

28. The non-transitory computer-readable storage medium of claim 21, wherein the classification model is a logistic regression model, and wherein the logistic regression model generates probabilities that data points have a particular classification.

29. The non-transitory computer-readable storage medium of claim 21, wherein imbalanced data set includes a set of data points corresponding to simulated transactions.

30. The non-transitory computer-readable storage medium of claim 21, wherein the quantifiable losses correspond to monetary costs resulting from misclassifications of the imbalanced data set.

* * * * *